(12) United States Patent
Wang et al.

(10) Patent No.: US 11,154,814 B2
(45) Date of Patent: Oct. 26, 2021

(54) SYSTEM AND METHOD FOR WASHING AND TREATING FERMENTATION ODOR AND COMBUSTION FLUE GAS

(71) Applicants: HUNAN SAKAL ENVIRONMENTAL SCIENCE AND TECHNOLOGY CO., LTD., Changsha (CN); Shen Wang, Changsha (CN)

(72) Inventors: Shen Wang, Changsha (CN); Wen Kuang, Changsha (CN); Juncan Wang, Changsha (CN)

( * ) Notice: Subject to any disclaimer, the term of this patent is extended or adjusted under 35 U.S.C. 154(b) by 345 days.

(21) Appl. No.: 16/246,377

(22) Filed: Jan. 11, 2019

(65) Prior Publication Data

US 2019/0143268 A1 May 16, 2019

Related U.S. Application Data

(63) Continuation of application No. PCT/CN2016/090667, filed on Jul. 20, 2016.

(51) Int. Cl.
*B01D 53/85* (2006.01)
*F23J 15/04* (2006.01)
(Continued)

(52) U.S. Cl.
CPC ......... *B01D 53/85* (2013.01); *B01D 53/1462* (2013.01); *B01D 53/1481* (2013.01); *B01D 53/1493* (2013.01); *B01D 53/185* (2013.01); *B01D 53/40* (2013.01); *B01D 53/75* (2013.01); *B01D 53/84* (2013.01); *F23J 15/04* (2013.01);
(Continued)

(58) Field of Classification Search
None
See application file for complete search history.

(56) References Cited

U.S. PATENT DOCUMENTS

| 2007/0090558 A1 | 4/2007 | Vollrath et al. |
| 2010/0072066 A1 | 5/2010 | Pedersen-bjergaard et al. |
| 2012/0311991 A1* | 12/2012 | Mall ...................... C10K 1/024 60/39.12 |

FOREIGN PATENT DOCUMENTS

| CN | 101732983 A | 6/2010 |
| CN | 202113772 U | 1/2012 |

(Continued)

OTHER PUBLICATIONS

Internation Search Report of PCT/CN2016/090667, dated Apr. 20, 2017.

*Primary Examiner* — William H. Beisner

(57) ABSTRACT

A washing treatment system includes an odor and flue gas washing tower, a biological deodorization filtering tower, a multifunctional biomass combustion boiler, a liquid fermentation reactor, a solid fermentation reactor, circulating pumps, an exhaust fan and an induced draft fan. An exhaust port is formed in a top end cover of the odor and flue gas washing tower. A liquid inlet, an air inlet and a liquid drainage port are formed in a side wall of a tank body. A hanging basket is placed in the tank body. Organic fillers and/or inorganic fillers are placed in the hanging basket. An inner cavity of the washing tower is divided into a liquid inlet shunting cavity, a filler layer, an air cavity and a liquid accumulation cavity from top to bottom. An upper supernatant in the liquid fermentation reactor is connected with the liquid inlet for washing.

10 Claims, 5 Drawing Sheets

(51) Int. Cl.
*B01D 53/84* (2006.01)
*B01D 53/14* (2006.01)
*B01D 53/18* (2006.01)
*B01D 53/40* (2006.01)
*B01D 53/75* (2006.01)

(52) U.S. Cl.
CPC .. *B01D 2252/103* (2013.01); *B01D 2257/302* (2013.01); *B01D 2257/304* (2013.01); *B01D 2257/404* (2013.01); *B01D 2257/406* (2013.01); *B01D 2257/502* (2013.01); *B01D 2258/0266* (2013.01); *B01D 2258/0291* (2013.01); *B01D 2258/05* (2013.01); *F23G 2209/26* (2013.01); *Y02A 50/20* (2018.01); *Y02E 50/30* (2013.01); *Y02P 20/10* (2015.11); *Y02W 30/40* (2015.05)

(56) References Cited

FOREIGN PATENT DOCUMENTS

| CN | 102632071 A | 8/2012 | |
|---|---|---|---|
| CN | 202700937 U | 1/2013 | |
| CN | 202860400 U | 4/2013 | |
| CN | 103561878 A | 2/2014 | |
| CN | 103619499 A | 3/2014 | |
| CN | 104312918 A | 1/2015 | |
| EP | 0329643 A1 * | 8/1989 | ............. B01D 53/34 |
| WO | 2012024758 A1 | 3/2012 | |

* cited by examiner

SYSTEM AND METHOD FOR WASHING AND TREATING FERMENTATION ODOR AND COMBUSTION FLUE GAS

CROSS-REFERENCE TO RELATED APPLICATIONS

This application is a continuation of International Patent Application No. PCT/CN2016/090667 with a filing date of Jul. 20, 2016, designating the United States, now, and further claims priority to Chinese Patent Application No. 201610538009.7 with a filing date of Jul. 11, 2016. The content of the aforementioned applications, including any intervening amendments thereto, are incorporated herein by reference.

TECHNICAL FIELD

The present disclosure belongs to the technical field of environmental protection, and particularly relates to a system and method for washing and treating fermentation odor and combustion flue gas. The fermentation odor means odor produced by fermentation of organic waste. The combustion flue gas means tail gas produced by combustion of organic waste pollutants in rural areas such as dead livestock and poultry animals, placentas, domestic garbage and straw, and combustion of fossil fuel.

BACKGROUND OF THE PRESENT INVENTION

In the fermentation and composting process of organic waste, under aerobic or anoxic conditions, organic components in materials such as protein are decomposed by microorganisms, producing a large number of toxic and harmful odor gases. If the odor is not treated and is discharged directly into the atmosphere, the atmospheric environment of composting plants and surroundings will be seriously affected. Therefore, deodorization engineering in the composting process becomes an indispensable part of high-temperature composting process of organic solid waste.

In the fermentation and composting process of the organic waste in a reactor, in order to increase the fermentation efficiency, shorten the composting time and improve the quality of organic fertilizers, heat sources are often set to heat the reactor, such as coal, diesel oil and biomass fuel for combustion. However, in the process of combustion, these heat sources inevitably produce particulate matter such as soot, and toxic and harmful gases such as carbon monoxide (CO), sulfur dioxide ($SO_2$) and nitrogen oxides ($NO_x$), causing serious air and environment pollution, producing a series of environmental problems such as acid rain, greenhouse effect and haze, and bringing a great negative impact on human production and life. It is of great practical significance to treat flue gas produced in the combustion process of the heat sources and avoid secondary pollution while treating the pollution of the organic solid waste.

At present, the methods of harmless treatment of dead livestock and poultry animals and placentas are generally high temperature incineration and sanitary landfill. The content of organic matter (such as protein and fat) in the dead livestock and poultry animals and placentas is high, and a large number of particulate matter (soot) and acid gas ($NO_X$ and $SO_2$) are produced in the incineration process due to incomplete combustion, thereby seriously polluting the water source and the air.

Due to geographical dispersion, rural domestic garbage has high treatment cost and is generally dumped and burned at will by people. A large number of particulate matter (soot) and acid gas (CO, $NO_X$, $SO_2$ and HCl) are produced in the incineration process, causing serious pollution. How to effectively dispose the rural domestic garbage and reduce the pollution has become a major problem in the construction of a new socialist modernization countryside.

In recent years, governments at all levels have enacted a series of laws and regulations to prohibit straw incineration. However, in the vast rural areas, the phenomenon of straw incineration still occurs despite repeated prohibitions, and seems to be worsening. Smog produced from straw incineration not only seriously pollutes the air and poses a serious threat to human health, but also causes frequent fire accidents and poses a threat to traffic safety.

In the fermentation and composting process of the organic waste, the microorganisms produce a lot of heat while decomposing the organic waste, and the heat is discharged with the odor. Fossil fuel such as coal, natural gas and diesel oil, rural domestic garbage and crop straw release a lot of heat during combustion. Part of the heat is discharged with the flue gas. The toxic and harmful gases containing a lot of heat are discharged arbitrarily, which not only pollutes the environment, but also wastes heat energy. At present, the hot gases are treated mainly through a cooling device for cooling, but most of the heat in the exhaust gas is not used or is underutilized. Meanwhile, the flue gas also contains a large amount of toxic acid gas. In industrial production, a cloth bag is generally used for dust removal, and alkali neutralization and other operations are used for dust removal. The method is complex and the equipment input cost is high. In a system for treating combustion waste gas of fossil fuel by a biological method of a Chinese patent 200910216681, a cooling tower is adopted for cooling treatment for tail gas, but the heat is not used, causing waste of heat energy. In a Chinese patent 201410567892.3, hot waste gas produced by combustion of the fuel heats organic waste in the reactor, with the main purpose of promoting a fermentation reaction. However, the odor exhausted from the reactor still contains a lot of heat. How to conduct environmental protection treatment has not been clarified.

SUMMARY OF PRESENT INVENTION

The purpose of the present disclosure is to solve the above problems in the prior art, so as to provide a system and method for washing and treating fermentation odor and combustion flue gas, thereby effectively solving the treatment problem of fermentation odor of organic waste and combustion flue gas of organic waste in rural areas such as dead livestock and poultry animals, placentas, domestic garbage and straw, and fossil fuel without secondary pollution. Heat in the odor and the flue gas is used to increase thermal efficiency, shorten fermentation time, reduce equipment and production cost, and realize environmental protection and energy saving.

The present disclosure adopts the following technical solution:

A system for washing and treating fermentation odor and combustion flue gas includes a washing tower, a biological deodorization filtering tower, a multifunctional biomass combustion boiler, a liquid fermentation reactor, a solid fermentation reactor, circulating pumps, an exhaust fan and an induced draft fan, wherein the washing tower is an odor and flue gas washing tower; an exhaust port is formed in a top end cover of the washing tower; a liquid inlet is formed in an upper part of a side wall of a tank body of the washing tower; an air inlet is formed in a middle part of the side wall of the tank body; a liquid drainage port is formed in a lower part of the side wall of the tank body; a hanging basket is placed in the middle part in the tank body; organic fillers and/or inorganic fillers are placed in the hanging basket; therefore, an inner cavity of the washing tower is divided into a liquid inlet shunting cavity, a filler layer, an air cavity and a liquid accumulation cavity from top to bottom; the hanging basket and the organic fillers and/or the inorganic fillers placed in the hanging basket form the filler layer; the liquid inlet shunting cavity is positioned on the upper part of the filler layer; the air cavity is positioned on the lower part of the filler layer; the liquid accumulation cavity is positioned on the bottom in the tank body; the liquid inlet is communicated with the liquid inlet shunting cavity, the air inlet is communicated with the air cavity; the liquid drainage port is communicated with the liquid accumulation cavity; an input pipeline of the circulating pump A is connected with an upper supernatant in the liquid fermentation reactor; an output pipeline of the circulating pump A is connected with the liquid inlet of the washing tower; a smoke vent of the multifunctional biomass combustion boiler is connected with the air inlet of the washing tower through the pipeline and the exhaust fan; the exhaust port of the washing tower is connected with the biological deodorization filtering tower through the pipeline and the induced draft fan B; an exhaust port of the liquid fermentation reactor and an exhaust port of the solid fermentation reactor are connected with the air inlet of the washing tower through the pipeline and the induced draft fan A; and the liquid drainage port at the lower part of the washing tower is connected with the liquid inlet in the top of the liquid fermentation reactor through the circulating pump B and the pipeline.

In the above technical solution, the hanging basket is placed on a bracket on an inner wall of the tank body; the hanging basket is composed of a perforated plate, a vertical frame and a shunting plate; the shunting plate is fixed to an upper end of the vertical frame of the hanging basket; and the perforated plate is fixed to a lower end of the vertical frame.

In the above technical solution, the shunting plate is a dome-shaped perforated plate; the circumference or side edge of the hanging basket is provided with a reticulate border or a perforated plate; and the circumference or side edge of the hanging basket has no border.

In the above technical solution, the odor includes odor exhausted when solid organic waste and liquid organic waste are fermented in the fermentation reactors; and the flue gas includes flue gas produced when organic waste in rural areas such as dead livestock and poultry animals, placentas, domestic garbage and straw, and fossil fuel are combusted in the multifunctional biomass combustion boiler.

In the above technical solution, the liquid accumulation cavity on the bottom in the tank body is provided with a level gauge; and the level gauge controls the circulating pumps on a liquid drainage pipeline through a control device.

In the above technical solution, the organic fillers mean that organic waste such as leaves, bark and sawdust is mixed according to a certain ratio to produce a carrier, and microorganisms with deodorization function are inoculated on the carrier, and the process that the odor or flue gas passes through the organic fillers with the microorganisms grown on surfaces is a process of mass transfer and biodegradation of odorous substances.

In the above technical solution, the organic fillers also include carbon, volcanic rock and/or ceramsite.

In the above technical solution, the inorganic fillers include hollow spheres, Raschig rings, Pall rings and/or cascade rings.

A method for washing and treating fermentation odor and combustion flue gas includes:

(1) building a system for washing and treating fermentation odor and combustion flue gas, wherein the washing treatment system includes a washing tower, a biological deodorization filtering tower, a multifunctional biomass combustion boiler, a liquid fermentation reactor, a solid fermentation reactor, circulating pumps, an exhaust fan and an induced draft fan; the washing tower is an odor and flue gas washing tower; an exhaust port is formed in a top end cover of the washing tower; a liquid inlet is formed in an upper part of a side wall of a tank body of the washing tower; an air inlet is formed in a middle part of the side wall of the tank body; a liquid drainage port is formed in a lower part of the side wall of the tank body; a hanging basket is placed in the middle part in the tank body; organic fillers and/or inorganic fillers are placed in the hanging basket; therefore, an inner cavity of the washing tower is divided into a liquid inlet shunting cavity, a filler layer, an air cavity and a liquid accumulation cavity from top to bottom; the hanging basket and the organic fillers and/or the inorganic fillers placed in the hanging basket form the filler layer; the liquid inlet shunting cavity is positioned on the upper part of the filler layer; the air cavity is positioned on the lower part of the filler layer; the liquid accumulation cavity is positioned on the bottom in the tank body; the liquid inlet is communicated with the liquid inlet shunting cavity; the air inlet is communicated with the air cavity, the liquid drainage port is communicated with the liquid accumulation cavity; an input pipeline of the circulating pump A is connected with an upper supernatant in the liquid fermentation reactor, an output pipeline of the circulating pump A is connected with the liquid inlet of the washing tower; a smoke vent of the multifunctional biomass combustion boiler is connected with the air inlet of the washing tower through the pipeline and the exhaust fan; the exhaust port of the washing tower is connected with the biological deodorization filtering tower through the pipeline and the induced draft fan B; an exhaust port of the liquid fermentation reactor and an exhaust port of the solid fermentation reactor are connected with the air inlet of the washing tower through the pipeline and the induced draft fan A; and the liquid drainage port at the lower part of the washing tower is connected with the liquid inlet in the top of the liquid fermentation reactor through the circulating pump B and the pipeline;

(2) leading the odor produced when the organic waste is fermented in the liquid fermentation reactor and/or the solid fermentation reactor to the air inlet of the air cavity of the washing tower through the induced draft fan A to enter the washing tower;

(3) feeding one or more of organic waste pollutants in rural areas such as dead livestock and poultry animals, placentas, domestic garbage and straw, and fossil fuel into the multifunctional biomass combustion boiler, feeding the flue gas produced by combustion into the air cavity of the washing tower through the exhaust fan and the air inlet of the washing tower;

(4) simultaneously starting the circulating pump A and the circulating pump B; pumping the livestock and poultry feces and urine supernatant at the upper part of the liquid fermentation reactor to the liquid inlet at the upper part of the washing tower to enter the liquid inlet shunting cavity in the washing tower; allowing the livestock and poultry feces and urine supernatant to evenly flow into the filler layer in the washing tower through the shunting plate of the hanging basket; and enabling the feces and urine supernatant, and the odor and the flue gas to perform full contact, heat exchange and mass exchange in the filler layer;

(5) joining feces and urine washing filtrate after heat exchange and mass exchange into the liquid accumulation cavity on the bottom of the washing tower; and automatically starting the circulating pumps on the liquid drainage pipeline when the level gauge in the liquid accumulation cavity detects that the feces and urine washing filtrate reaches a high level, so as to feed the feces and urine washing filtrate into the liquid fermentation reactor for performing high-temperature aerobic fermentation to prepare a liquid organic fertilizer;

(6) exhausting tail gas produced after the odor and the flue gas are subjected to heat exchange and mass exchange from an exhaust port at the top of the washing tower; feeding the tail gas into the biological deodorization filtering tower through the induced draft fan; absorbing and converting by the biological fillers in the biological deodorization filtering tower; and discharging the tail gas after reaching the standard; and (7) in replacing the fillers in the washing tower, opening the top end cover of the washing tower, taking out the hanging basket, and feeding the taken organic fillers into the solid fermentation reactor for performing high-temperature aerobic fermentation to prepare an organic fertilizer.

In the above technical solution, the organic fillers mean that organic waste such as leaves, bark and sawdust is mixed according to a certain ratio to produce a carrier, and microorganisms with deodorization function are inoculated on the carrier.

In the above technical solution, the organic fillers include carbon, volcanic rock and/or ceramsite; and the inorganic fillers include hollow spheres, Raschig rings, Pall rings and/or cascade rings.

Organic waste pollutants in rural areas such as livestock and poultry feces and urine, dead livestock and poultry animals, placentas, domestic garbage and straw are important sources of rural environmental pollution. The present disclosure not only can treat odor produced in the high-temperature fermentation process of organic waste such as livestock and poultry feces and urine, but also can treat tail gas produced in the combustion process of organic waste pollutants in rural areas such as dead livestock and poultry animals, placentas, domestic garbage and straw, and fossil fuel, thereby making an important contribution to rural environmental pollution treatment.

The present disclosure treats the problem of fermentation odor of the organic waste, and combustion tail gas of organic waste pollutants in rural areas such as dead livestock and poultry animals, placentas, domestic garbage and straw, and fossil fuel through a combination of a washing tower and a biological deodorization filtering tower, and absorbs solid particles and acidic gas in the odor and the flue gas through livestock and poultry feces and urine liquid, thereby reducing the pH of the livestock and poultry feces and urine liquid, reducing nitrogen loss caused by ammonia gas release and increasing organic matter and nutrients in the livestock and poultry feces and urine liquid. The odor produced in the fermentation and composting process of the organic waste and the flue gas such as PM2.5 and other small particles produced in the combustion process of a heat source can be absorbed by the livestock and poultry feces and urine liquid, and partly converted into beneficial nutrients. Acid gas such as hydrogen sulfide produced in the fermentation and composting process of the organic waste and acid gas such as sulfur dioxide, sulfur trioxide, nitric oxide and nitrogen dioxide produced in the combustion process of the heat source are combined with water molecules in the livestock and poultry feces and urine liquid to release H+, thereby reducing the pH of the livestock and poultry feces and urine liquid, reducing ammonia gas release, decreasing the livestock and poultry feces and urine liquid and reducing the loss of nutrient elements.

The present disclosure heats the livestock and poultry feces and urine liquid through the odor and the flue gas, shortens the heating time of subsequent high-temperature fermentation of the livestock and poultry feces and urine liquid, reduces energy consumption, eliminates the cooling link of odor treatment and saves cost. In the fermentation and composting process of the organic waste, a lot of heat is generated while microorganisms decompose the organic wastes. As the odor is exhausted, the hot gases are fed into the washing tower, come into full contact with the livestock and poultry feces and urine liquid and exchange the heat, thereby heating the livestock and poultry feces and urine liquid, shortening the subsequent heating time of the livestock and poultry feces and urine liquid and reducing energy consumption. Exhaust gas discharged from the washing tower is greatly cooled, directly fed into the biological deodorization filtering tower, absorbed and converted by biological fillers in the biological deodorization filtering tower and discharged after reaching the standard, thereby eliminating a conventional cooling link, reducing process links and saving equipment cost.

The washing tower in the present disclosure is unique in design. Feed and discharge convenience is fully considered. The hanging basket is designed into a perforated plate structure without protecting net, thereby ensuring high efficiency of the washing tower, ensuring feed and discharge convenience and reducing labor cost. Substitute organic fillers can be used as raw materials of a high-temperature aerobic fermentation organic fertilizer without secondary pollution.

The present disclosure feeds the gas exhausted from the washing tower to the biological deodorization filtering tower, and degrades and purifies volatile organic matter and some biodegradable inorganic matter in the exhaust gas through a microbiological filtration technology to purify the exhaust gas. The method has the following advantages: (1) effective rate is high, and the waste gas can be purified by microbial filtration for a short time; (2) usage ensures safety, and compared with other physical and chemical techniques for treating the odor and the organic waste gas, the present disclosure has no hidden danger of safety, (3) cost is low; because the treatment time is short, the volume of the biological deodorization filtering tower is small; because any chemical substance is not required to be added, equipment investment and operating expense is low; (4) replacement and addition of filter material are convenient, and the labor cost is reduced; and (5) waste filter material can be used as carbonaceous auxiliary material of the aerobic fermentation technology without any secondary pollution.

In conclusion, the present disclosure not only treats odor pollution produced in the fermentation and composting process of the organic waste, but also treats tail gas pollution produced in the combustion process of organic waste pollutants in rural areas such as dead livestock and poultry animals, placentas, domestic garbage and straw, and fossil fuel, and also heats the livestock and poultry feces and urine liquid, thereby increasing thermal efficiency, shortening fermentation time, reducing equipment and production cost, realizing convenient feed and discharge and producing no secondary pollution. The present disclosure is environmentally friendly and energy-saving, and truly realizes the combination and unification of ecological benefits and economic benefits.

LIST OF REFERENCE NUMERALS

Figure 1:
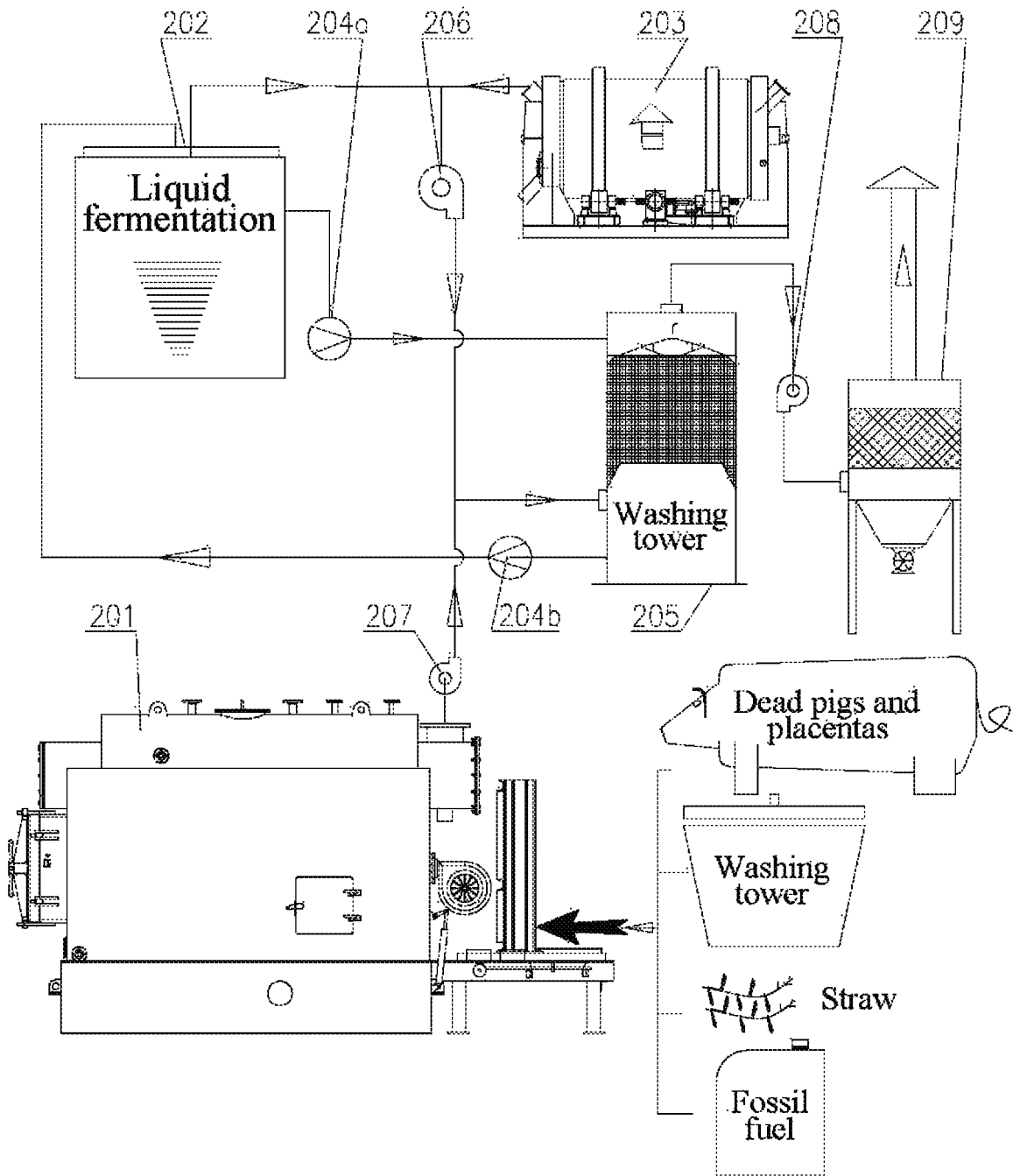
FIG. 1 is a schematic diagram of a treatment system and method of the present disclosure.

101—liquid accumulation cavity; 102—bracket; 103—top end cover, 104—exhaust port; 105—liquid inlet; 106—shunting plate; 107—hanging basket; 108—air inlet; 109—upper and lower liquid level detection sensor, 110—liquid drainage port; 111—vertical frame; 112—perforated plate; 201—multifunctional biomass combustion boiler, 202—liquid fermentation reactor; 203—solid fermentation reactor, 204a—circulating pump A; 204b—circulating pump B; 205—washing tower; 206—induced draft fan; 207—exhaust fan; 208—induced draft fan B; 209—biological deodorization filtering tower; 301—incineration door, 302—feeding equipment of dead livestock and poultry animals or domestic garbage; 303—flue gas exhaust port; and 304—automatic straw fuel conveying equipment.

DETAILED DESCRIPTION OF PREFERRED EMBODIMENTS

A system for washing and treating fermentation odor and combustion flue gas in the present disclosure includes a washing tower, a biological deodorization filtering tower, a multifunctional biomass combustion boiler, a liquid fermentation reactor, a solid fermentation reactor, circulating pumps, an exhaust fan and an induced draft fan. The washing tower is an odor and flue gas washing tower; an exhaust port is formed in a top end cover of the washing tower; a liquid inlet is formed in an upper part of a side wall of a tank body of the washing tower; an air inlet is formed in a middle part of the side wall of the tank body; a liquid drainage port is formed in a lower part of the side wall of the tank body; a hanging basket is placed in the middle part in the tank body; organic fillers and/or inorganic fillers are placed in the hanging basket; therefore, an inner cavity of the washing tower is divided into a liquid inlet shunting cavity, a filler layer; an air cavity and a liquid accumulation cavity from top to bottom; the hanging basket and the organic fillers and/or the inorganic fillers placed in the hanging basket form the filler layer; the liquid inlet shunting cavity is positioned on the upper part of the filler layer; the air cavity is positioned on the lower part of the filler layer; the liquid accumulation cavity is positioned on the bottom in the tank body; the liquid inlet is communicated with the liquid inlet shunting cavity, the air inlet is communicated with the air cavity, the liquid drainage port is communicated with the liquid accumulation cavity, an input pipeline of the circulating pump A is connected with an upper supernatant in the liquid fermentation reactor, an output pipeline of the circulating pump A is connected with the liquid inlet of the washing tower; a smoke vent of the multifunctional biomass combustion boiler is connected with the air inlet of the washing tower through the pipeline and the exhaust fan; the exhaust port of the washing tower is connected with the biological deodorization filtering tower through the pipeline and the induced draft fan B; an exhaust port of the liquid fermentation reactor and an exhaust port of the solid fermentation reactor are connected with the air inlet of the washing tower through the pipeline and the induced draft fan A; and the liquid drainage port at the lower part of the washing tower is connected with the liquid inlet in the top of the liquid fermentation reactor through the circulating pump B and the pipeline. The hanging basket is placed on a bracket on an inner wall of the tank body; the hanging basket is composed of a perforated plate, a vertical frame and a shunting plate; the shunting plate is fixed to an upper end of the vertical frame of the hanging basket; and the perforated plate is fixed to a lower end of the vertical frame. The shunting plate is a dome-shaped perforated plate; and the circumference or side edge of the hanging basket has no border. The odor includes odor exhausted when solid organic waste and liquid organic waste are fermented in the fermentation reactors; and the flue gas includes flue gas produced when organic waste in rural areas such as dead livestock and poultry animals, placentas, domestic garbage and straw, and fossil fuel are combusted in the multifunctional biomass combustion boiler. The liquid accumulation cavity on the bottom in the tank body is provided with a level gauge; and the level gauge controls the circulating pumps on a liquid drainage pipeline through a control device. The organic fillers mean that organic waste such as leaves, bark and sawdust is mixed according to a certain ratio to produce a carrier, and microorganisms with deodorization function are inoculated on the carrier, and the process that the odor or flue gas passes through the organic fillers with the microorganisms grown on surfaces is a process of mass transfer and biodegradation of odorous substances. The organic fillers also include carbon, volcanic rock and/or ceramsite. The inorganic fillers include hollow spheres, Raschig rings, Pall rings and/or cascade rings.

A method for washing and treating fermentation odor and combustion flue gas in the present disclosure includes:

(1) building a system for washing and treating fermentation odor and combustion flue gas, wherein the washing treatment system includes a washing tower, a biological deodorization filtering tower, a multifunctional biomass combustion boiler, a liquid fermentation reactor, a solid fermentation reactor, circulating pumps, an exhaust fan and an induced draft fan; the washing tower is an odor and flue gas washing tower; an exhaust port is formed in a top end cover of the washing tower; a liquid inlet is formed in an upper part of a side wall of a tank body of the washing tower; an air inlet is formed in a middle part of the side wall of the tank body; a liquid drainage port is formed in a lower part of the side wall of the tank body; a hanging basket is placed in the middle part in the tank body; organic fillers and/or inorganic fillers are placed in the hanging basket; therefore, an inner cavity of the washing tower is divided into a liquid inlet shunting cavity, a filler layer, an air cavity and a liquid accumulation cavity from top to bottom; the hanging basket and the organic fillers and/or the inorganic fillers placed in the hanging basket form the filler layer; the liquid inlet shunting cavity is positioned on the upper part of the filler layer; the air cavity is positioned on the lower part of the filler layer; the liquid accumulation cavity is positioned on the bottom in the tank body; the liquid inlet is communicated with the liquid inlet shunting cavity; the air inlet is communicated with the air cavity; the liquid drainage port is communicated with the liquid accumulation cavity; an input pipeline of the circulating pump A is connected with an upper supernatant in the liquid fermentation reactor, an output pipeline of the circulating pump A is connected with the liquid inlet of the washing tower; a smoke vent of the multifunctional biomass combustion boiler is connected with the air inlet of the washing tower through the pipeline and the exhaust fan; the exhaust port of the washing tower is connected with the biological deodorization filtering tower through the pipeline and the induced draft fan B; an exhaust port of the liquid fermentation reactor and an exhaust port of the solid fermentation reactor are connected with the air inlet of the washing tower through the pipeline and the induced draft fan A; and the liquid drainage port at the lower part of the washing tower is connected with the liquid inlet in the top of the liquid fermentation reactor through the circulating pump B and the pipeline;

(2) leading the odor produced when the organic waste is fermented in the liquid fermentation reactor and/or the solid fermentation reactor to the air inlet of the air cavity of the washing tower through the induced draft fan A to enter the washing tower;

(3) feeding one or more of organic waste pollutants in rural areas such as dead livestock and poultry animals, placentas, domestic garbage and straw, and fossil fuel into the multifunctional biomass combustion boiler, feeding the flue gas produced by combustion into the air cavity of the washing tower through the exhaust fan and the air inlet of the washing tower;

(4) simultaneously starting the circulating pump A and the circulating pump B; pumping the livestock and poultry feces and urine supernatant at the upper part of the liquid fermentation reactor to the liquid inlet at the upper part of the washing tower to enter the liquid inlet shunting cavity in the washing tower; allowing the livestock and poultry feces and urine supernatant to evenly flow into the filler layer in the washing tower through the shunting plate of the hanging basket; and enabling the feces and urine supernatant, and the odor and the flue gas to perform full contact, heat exchange and mass exchange in the filler layer;

(5) joining feces and urine washing filtrate after heat exchange and mass exchange into the liquid accumulation cavity on the bottom of the washing tower; and automatically starting the circulating pumps on the liquid drainage pipeline when the level gauge in the liquid accumulation cavity detects that the feces and urine washing filtrate reaches a high level so as to feed the feces and urine washing filtrate into the liquid fermentation reactor for performing high-temperature aerobic fermentation to prepare a liquid organic fertilizer;

(6) exhausting tail gas produced after the odor and the flue gas are subjected to heat exchange and mass exchange from an exhaust port at the top of the washing tower; feeding the tail gas into the biological deodorization filtering tower through the induced draft fan; absorbing and converting by the biological fillers in the biological deodorization filtering tower; and discharging the tail gas after reaching the standard; and (7) in replacing the fillers in the washing tower, opening the top end cover of the washing tower, taking out the hanging basket, and feeding the taken organic fillers into the solid fermentation reactor for performing high-temperature aerobic fermentation to prepare an organic fertilizer.

The organic fillers mean that organic waste such as leaves, bark and sawdust is mixed according to a certain ratio to produce a carrier, and microorganisms with deodorization function are inoculated on the carrier. The organic fillers include carbon, volcanic rock and/or ceramsite; and the inorganic fillers include hollow spheres, Raschig rings, Pall rings and/or cascade rings.

The present disclosure is further described below in detail with reference to drawings.

Figure 2:
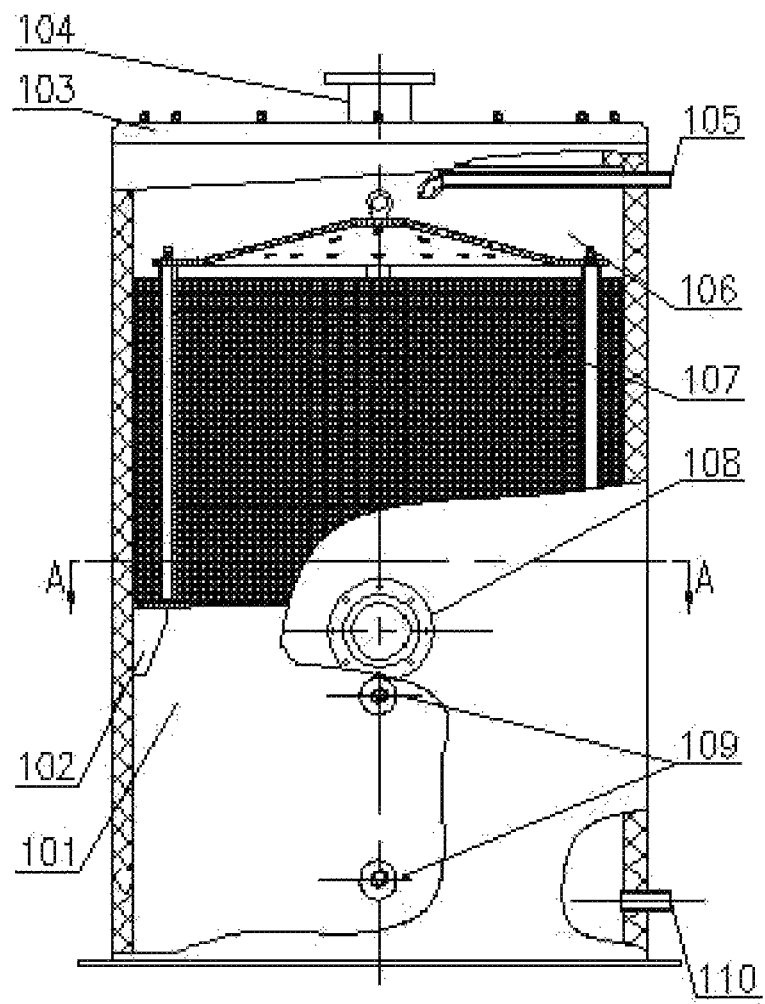
FIG. 2 is a structural schematic diagram of a washing tower of the present disclosure.
Figure 3:
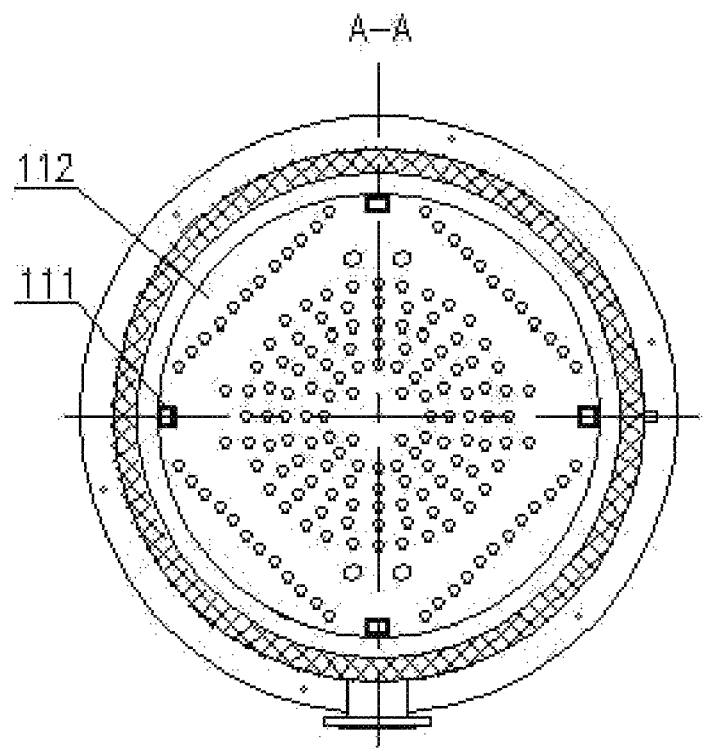
FIG. 3 is a schematic diagram along line A-A shown in FIG. 2.
Figure 4:
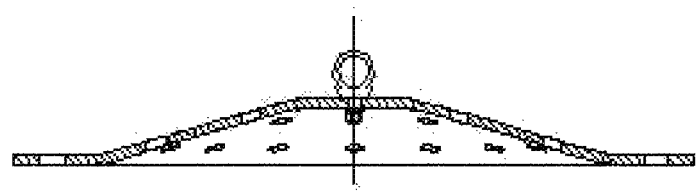
FIG. 4 is a longitudinal sectional view of a shunting plate in FIG. 2.
Figure 5:
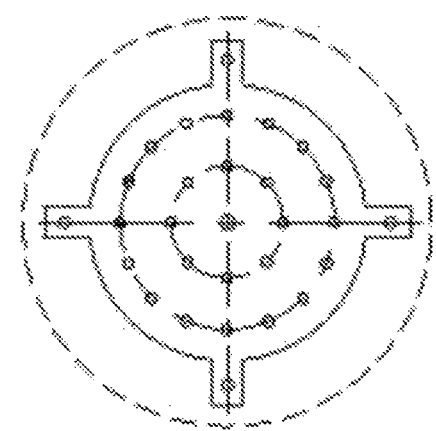
FIG. 5 is a top view of FIG. 4.

A washing tower structure, as shown in FIG. 2 and FIG. 4, mainly includes a top end cover 103, an exhaust port 104, a liquid inlet 105, a hanging basket 107, an air inlet 108, a liquid level sensor 109 and a liquid drainage port 110. A sectional view of a hanging basket structure is shown in FIG. 4. The hanging basket 107 is mainly composed of a perforated plate 112, a vertical frame 111 and a shunting plate 106. The exhaust port 104 is positioned in the top end cover 103. The liquid inlet is positioned above the shunting plate 106 in the side wall of the washing tower. The hanging basket 107 is placed on the bracket 102. A filler layer with certain height is placed on the perforated plate 112. The air inlet 108 is positioned between the hanging basket 107 and the liquid accumulation cavity 101 on the side wall of the washing tower. The liquid accumulation cavity 101 is disposed on the bottom of the washing tower, and the liquid drainage port 110 is disposed at a lowest position of the liquid accumulation cavity 101.

The system of the present disclosure is shown in FIG. 1. The smoke vent of the multifunctional biomass combustion boiler 201 is connected with the air inlet of the exhaust fan 207 through a pipeline. The exhaust port of the exhaust fan 207 is connected with the air inlet of the washing tower 205 through a pipeline. The exhaust port of the washing tower 205 is connected with the induced draft fan 208 through a pipeline. The other end of the induced draft fan 208 is connected with the air inlet of the biological deodorization filtering tower 209. The exhaust port of the solid fermentation reactor 203 and the exhaust flange of the liquid fermentation reactor 202 are respectively connected with the air inlet of the induced draft fan 206 in parallel through pipelines. The exhaust port of the induced draft fan 206 is connected with the air inlet of the washing tower 205 through the pipeline. A washing liquid drainage port of the liquid fermentation reactor 202 is connected with the input end of the circulating pump 204a through the pipeline, and the output end of the circulating pump 204a is connected with the liquid inlet of the washing tower 205 through the pipeline. The liquid drainage port of the washing tower 205 is connected with the input end of the circulating pump 204b through the pipeline, and the output end of the circulating pump 204b is connected to a washing filtrate inlet of the liquid fermentation reactor 202 through the pipeline to form a loop.

Figure 6:
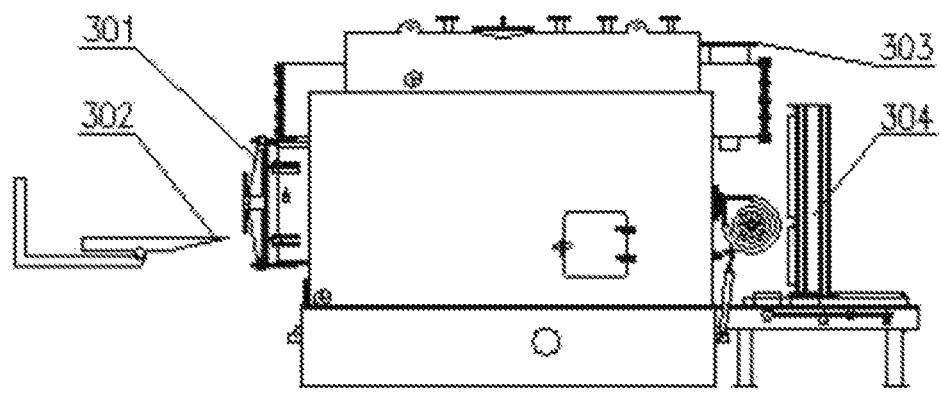
FIG. 6 is a structural schematic diagram of a multifunctional biomass combustion boiler of the present disclosure.
Figure 7:
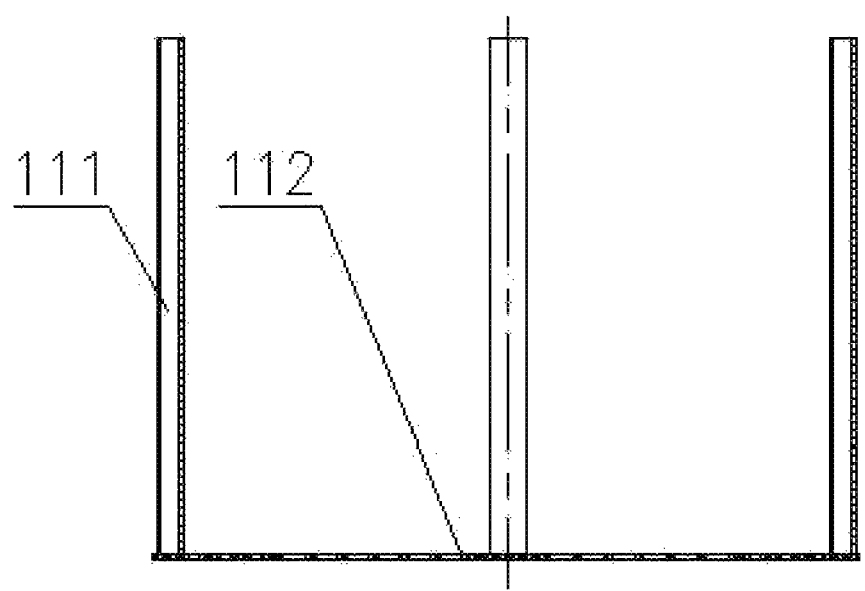
FIG. 7 is a structural sectional view of a hanging basket of the present disclosure.

A structural schematic diagram of a multifunctional biomass combustion boiler in the present disclosure is shown in FIG. 6. The multifunctional biomass combustion boiler 201 adopts mineral fuel such as diesel oil, or a burner such as biogas and natural gas as combustion equipment or ignition equipment. In regions with abundant straw resources, automatic straw fuel conveying equipment 304 is installed on the boiler, and straw blocks as fuel are conveyed to a grate of the multifunctional biomass combustion boiler 201. Meanwhile, the multifunctional biomass combustion boiler 201 has an openable incineration door 301. The dead livestock and poultry animals and the domestic garbage can be fed into a hearth of the boiler through the incineration door 301 by the feeding equipment 302 of dead livestock and poultry animals and domestic garbage, and are incinerated. The multifunctional biomass combustion boiler 201 is provided with a flue gas exhaust port 303. The flue gas exhaust port 303 is connected with the air inlet of the exhaust fan 207 through the pipeline.

Embodiment 1

The induced draft fan 206 is started. Odor exhausted in the fermentation process of the organic waste in the solid fermentation reactor 203 and the liquid fermentation reactor 202 is led into the washing tower from the air inlet at the bottom of the washing tower 205 via the induced draft fan 206. Meanwhile, the circulating water pump 204a is started. The feces and urine liquid in the liquid fermentation reactor 202 is pumped into the washing tower 205 from the liquid inlet at the top of the washing tower 205 via the circulating water pump 204a. The feces and urine liquid is evenly sprayed on the filler layer on the hanging basket 107 via the shunting plate 105 in the washing tower 205. After the odor and the feces and urine liquid conduct full heat exchange and mass exchange in the filler layer, gas exhausted from the liquid drainage port at the top of the washing tower 205 is led into the biological deodorization filtering tower 210 via the induced draft fan 208, absorbed and converted by biological fillers in the biological deodorization filtering tower 210, and discharged after reaching the standard.

When a liquid level sensor 109 in the washing tower 205 detects that the washing filtrate in the liquid accumulation cavity 101 is at a high level, the circulating pump 204b is automatically started to pump the washing filtrate to the liquid fermentation reactor 202 for conducting high-temperature aerobic fermentation.

When the fillers in the washing tower are replaced, the top end cover 103 is opened and the hanging basket 107 is hoisted out by a lifting device. The hoisted organic fillers are fed into the solid fermentation reactor 203 for conducting high-temperature aerobic fermentation. The hanging basket 107 is hoisted in. Fresh fillers are filled from the top of the washing tower 212. The top end cover 103 is closed. The substitute organic fillers are subjected to high-temperature aerobic fermentation to prepare a solid organic fertilizer.

Embodiment 2

The diesel oil is used as the combustion equipment of the multifunctional biomass combustion boiler 201. The flue gas from combustion is led into the washing tower 205 from the air inlet at the bottom of the washing tower 205 via the exhaust fan 207. Meanwhile, the circulating water pump 204a is started. The feces and urine liquid in the liquid fermentation reactor 202 is pumped into the washing tower 205 from the liquid inlet at the top of the washing tower 205 via the circulating water pump 204a. The feces and urine liquid is evenly sprayed on the filler layer on the hanging basket 107 via the shunting plate 105 in the washing tower 205. After the flue gas and the feces and urine liquid conduct full heat exchange and mass exchange in the filler layer, gas exhausted from the liquid drainage port at the top of the washing tower 205 is led into the biological deodorization filtering tower 210 via the induced draft fan 208, absorbed and converted by biological fillers in the biological deodorization filtering tower 210, and discharged after reaching the standard.

When a liquid level sensor 109 in the washing tower 205 detects that the washing filtrate in the liquid accumulation cavity 101 is at a high level, the circulating pump 204b is automatically started to pump the washing filtrate to the liquid fermentation reactor 202 for conducting high-temperature aerobic fermentation.

When the fillers in the washing tower are replaced, the top end cover 103 is opened and the hanging basket 107 is hoisted out by a lifting device. The hoisted organic fillers are fed into the solid fermentation reactor 203 for conducting high-temperature aerobic fermentation. The hanging basket 107 is hoisted in. Fresh fillers are filled from the top of the washing tower 212. The top end cover 103 is closed.

Embodiment 3

The automatic straw fuel conveying equipment 304 is started to feed straw into the multifunctional biomass combustion boiler 201. The diesel oil is used as the ignition equipment of the multifunctional biomass combustion boiler 201. The flue gas from combustion is led into the washing tower 205 from the air inlet at the bottom of the washing tower 205 via the exhaust fan 207. Meanwhile, the circulating water pump 204a is started. The feces and urine liquid in the liquid fermentation reactor 202 is pumped into the washing tower 205 from the liquid inlet at the top of the washing tower 205 via the circulating water pump 204a. The feces and urine liquid is evenly sprayed on the filler layer on the hanging basket 107 via the shunting plate 105 in the washing tower 205. After the flue gas and the feces and urine liquid conduct full heat exchange and mass exchange in the filler layer, gas exhausted from the liquid drainage port at the top of the washing tower 205 is led into the biological deodorization filtering tower 210 via the induced draft fan 208, absorbed and converted by biological fillers in the biological deodorization filtering tower 210, and discharged after reaching the standard.

When a liquid level sensor 109 in the washing tower 205 detects that the washing filtrate in the liquid accumulation cavity 101 is at a high level, the circulating pump 204b is automatically started to pump the washing filtrate to the liquid fermentation reactor 202 for conducting high-temperature aerobic fermentation.

When the fillers in the washing tower are replaced, the top end cover 103 is opened and the hanging basket 107 is hoisted out by a lifting device. The hoisted organic fillers are fed into the solid fermentation reactor 203 for conducting high-temperature aerobic fermentation. The hanging basket 107 is hoisted in. Fresh fillers are filled from the top of the washing tower 212. The top end cover 103 is closed.

Embodiment 4

The feeding equipment of dead livestock and poultry animals or domestic garbage 302 is started to feed dead livestock and poultry animals into the multifunctional biomass combustion boiler 201. The diesel oil is used as the ignition equipment of the multifunctional biomass combustion boiler 201. The flue gas from combustion is led into the washing tower 205 from the air inlet at the bottom of the washing tower 205 via the exhaust fan 207. Meanwhile, the circulating water pump 204a is started. The feces and urine liquid in the liquid fermentation reactor 202 is pumped into the washing tower 205 from the liquid inlet at the top of the washing tower 205 via the circulating water pump 204a. The feces and urine liquid is evenly sprayed on the filler layer on the hanging basket 107 via the shunting plate 105 in the washing tower 205. After the flue gas and the feces and urine liquid conduct full heat exchange and mass exchange in the filler layer, gas exhausted from the liquid drainage port at the top of the washing tower 205 is led into the biological deodorization filtering tower 210 via the induced draft fan 208, absorbed and converted by biological fillers in the biological deodorization filtering tower 210, and discharged after reaching the standard.

When a liquid level sensor 109 in the washing tower 205 detects that the washing filtrate in the liquid accumulation cavity 101 is at a high level, the circulating pump 204b is automatically started to pump the washing filtrate to the liquid fermentation reactor 202 for conducting high-temperature aerobic fermentation.

When the fillers in the washing tower are replaced, the top end cover 103 is opened and the hanging basket 107 is hoisted out by a lifting device. The hoisted organic fillers are fed into the solid fermentation reactor 203 for conducting high-temperature aerobic fermentation. The hanging basket 107 is hoisted in. Fresh fillers are filled from the top of the washing tower 212. The top end cover 103 is closed.

The liquid fermentation reactor, the solid fermentation reactor, the multifunctional biomass combustion boiler and the biological deodorization filtering tower in the present disclosure adopt mature patented technical products of the applicant.

We claim:

1. A system for washing and treating fermentation odor and combustion flue gas, comprising a washing tower, a biological deodorization filtering tower, a multifunctional biomass combustion boiler, a liquid fermentation reactor, a solid fermentation reactor, circulating pumps comprising a circulating pump A and a circulating pump B, an exhaust fan and induced draft fans comprising an induced draft fan A and an induced draft fan B, wherein the washing tower is an odor and flue gas washing tower; an exhaust port is formed in a top end cover of the washing tower; a liquid inlet is formed in an upper part of a side wall of a tank body of the washing tower; an air inlet is formed in a middle part of the side wall of the tank body; a liquid drainage port is formed in a lower part of the side wall of the tank body; a hanging basket is arranged in the middle part in the tank body; organic fillers and/or inorganic fillers are arranged in the hanging basket; therefore, an inner cavity of the washing tower is divided into a liquid inlet shunting cavity, a filler layer, an air cavity and a liquid accumulation cavity from top to bottom; the hanging basket and the organic fillers and/or the inorganic fillers arranged in the hanging basket form the filler layer; the liquid inlet shunting cavity is positioned on an upper part of the filler layer; the air cavity is positioned on a lower part of the filler layer; the liquid accumulation cavity is positioned on a bottom in the tank body; the liquid inlet is communicated with the liquid inlet shunting cavity; the air inlet is communicated with the air cavity; the liquid drainage port is communicated with the liquid accumulation cavity; an input pipeline of the circulating pump A is connected with an upper supernatant in the liquid fermentation reactor; an output pipeline of the circulating pump A is connected with the liquid inlet of the washing tower; a smoke vent of the multifunctional biomass combustion boiler is connected with the air inlet of the washing tower through a pipeline and the exhaust fan; the exhaust port of the washing tower is connected with the biological deodorization filtering tower through a pipeline and the induced draft fan B; an exhaust port of the liquid fermentation reactor and an exhaust port of the solid fermentation reactor are connected with the air inlet of the washing tower through a pipeline and the induced draft fan A; and the liquid drainage port at the lower part of the washing tower is connected with a liquid inlet in a top of the liquid fermentation reactor through the circulating pump B and a pipeline.

2. The system for washing and treating fermentation odor and combustion flue gas according to claim 1, wherein the hanging basket is placed on a bracket on an inner wall of the tank body; the hanging basket is composed of a perforated plate, a vertical frame and a shunting plate; the shunting plate is fixed to an upper end of the vertical frame of the hanging basket; and the perforated plate is fixed to a lower end of the vertical frame.

3. The system for washing and treating fermentation odor and combustion flue gas according to claim 2, wherein the shunting plate is a dome-shaped perforated plate; and a circumference or side edge of the hanging basket has no border or perforated plate.

4. The system for washing and treating fermentation odor and combustion flue gas according to claim 1, wherein the fermentation odor comprises odor exhausted when solid organic waste and liquid organic waste are fermented in the fermentation reactors; and the flue gas comprises flue gas produced when organic waste in rural areas and fossil fuel are combusted in the multifunctional biomass combustion boiler; the organic waste comprises at least one of dead livestock and poultry animals, placentas, domestic garbage and straw.

5. The system for washing and treating fermentation odor and combustion flue gas according to claim 1, further comprising a control device, wherein the liquid accumulation cavity on the bottom in the tank body is provided with a level gauge; and the level gauge controls the circulating pump B through the control device.

6. The system for washing and treating fermentation odor and combustion flue gas according to claim 1, wherein the organic fillers are that organic waste comprising at least one of leaves, bark and sawdust is mixed according to a certain ratio to produce a carrier, and microorganisms with deodorization function are inoculated on the carrier; and the process that the fermentation odor or flue gas passes through the organic fillers with the microorganisms grown on surfaces is a process of mass transfer and biodegradation of odorous substances.

7. The system for washing and treating fermentation odor and combustion flue gas according to claim 1, wherein the organic fillers further comprise carbon, volcanic rock and/or ceramsite; and the inorganic fillers comprise hollow spheres, Raschig rings, Pall rings and/or cascade rings.

8. A method for washing and treating fermentation odor and combustion flue gas, comprising
   (1) building a system for washing and treating fermentation odor and combustion flue gas, wherein the washing treatment system comprises a washing tower comprising a level gauge, a biological deodorization filtering tower, a multifunctional biomass combustion boiler, a liquid fermentation reactor, a solid fermentation reactor, circulating pumps comprising a circulating pump A and a circulating pump B, an exhaust fan and induced draft fans comprising an induced draft fan A and an induced draft fan B; the washing tower is an odor and flue gas washing tower; an exhaust port is formed in a top end cover of the washing tower; a liquid inlet is formed in an upper part of a side wall of a tank body of the washing tower; an air inlet is formed in a middle part of the side wall of the tank body; a liquid drainage port is formed in a lower part of the side wall of the tank body; a hanging basket is arranged in the middle part in the tank body; organic fillers and/or inorganic fillers are arranged in the hanging basket; therefore, an inner cavity of the washing tower is divided into a liquid inlet shunting cavity, a filler layer, an air cavity and a liquid accumulation cavity from top to bottom; the hanging basket and the organic fillers and/or the inorganic fillers arranged in the hanging basket form the filler layer; the liquid inlet shunting cavity is positioned on the upper part of the filler layer; the air cavity is positioned on the lower part of the filler layer; the liquid accumulation cavity is positioned on the bottom in the tank body; the liquid inlet is communicated with the liquid inlet shunting cavity; the air inlet is communicated with the air cavity; the liquid drainage port is communicated with the liquid accumulation cavity; an input pipeline of the circulating pump A is connected with an upper supernatant in the liquid fermentation reactor; an output pipeline of the circulating pump A is connected with the liquid inlet of the washing tower; a smoke vent of the multifunctional biomass combustion boiler is connected with the air inlet of the washing tower through a pipeline and the exhaust fan; the exhaust port of the washing tower is connected with the biological deodorization filtering tower through a pipeline and the induced draft fan B; an exhaust port of the liquid fermentation reactor and an exhaust port of the solid fermentation reactor are connected with the air inlet of the washing tower through a pipeline and the induced draft fan A; and the liquid drainage port at the lower part of the washing tower is connected with the liquid inlet in the top of the liquid fermentation reactor through the circulating pump B and a pipeline;

(2) leading the odor produced when organic waste is fermented in the liquid fermentation reactor and/or the solid fermentation reactor to the air inlet of the air cavity of the washing tower through the induced draft fan A to enter the washing tower;

(3) feeding one or more of organic waste pollutants comprising at least one of dead livestock and poultry animals, placentas, domestic garbage and straw in rural areas, and fossil fuel into the multifunctional biomass combustion boiler; feeding the flue gas produced by combustion into the air cavity of the washing tower through the exhaust fan and the air inlet of the washing tower;

(4) simultaneously starting the circulating pump A and the circulating pump B; pumping livestock and poultry feces and urine supernatant at the upper part of the liquid fermentation reactor to the liquid inlet at the upper part of the washing tower to enter the liquid inlet shunting cavity in the washing tower; allowing the livestock and poultry feces and urine supernatant to evenly flow into the filler layer in the washing tower through the shunting cavity of the hanging basket; and enabling the feces and urine supernatant, and the odor and the flue gas to perform full contact, heat exchange and mass exchange in the filler layer;

(5) joining feces and urine washing filtrate after heat exchange and mass exchange into the liquid accumulation cavity on the bottom of the washing tower; and automatically starting the circulating pump B when the level gauge in the liquid accumulation cavity detects that the feces and urine washing filtrate reaches a high level, so as to feed the feces and urine washing filtrate into the liquid fermentation reactor for performing high-temperature aerobic fermentation to prepare a liquid organic fertilizer;

(6) exhausting tail gas produced after the odor and the flue gas are subjected to heat exchange and mass exchange from an exhaust port at the top of the washing tower; feeding the tail gas into the biological deodorization filtering tower through the induced draft fan B; absorbing and converting by biological fillers in the biological deodorization filtering tower; and discharging the tail gas after reaching a standard; and (7) in replacing the fillers in the washing tower, opening the top end cover of the washing tower, taking out the hanging basket, and feeding the taken organic fillers into the solid fermentation reactor for performing high-temperature aerobic fermentation to prepare an organic fertilizer.

9. The method for washing and treating fermentation odor and combustion flue gas according to claim 8, wherein the organic fillers are that organic waste comprising at least one of leaves, bark and sawdust is mixed according to a certain ratio to produce a carrier, and microorganisms with deodorization function are inoculated on the carrier.

10. The method for washing and treating fermentation odor and combustion flue gas according to claim 8, wherein the organic fillers comprise carbon, volcanic rock and/or ceramsite; and the inorganic fillers comprise hollow spheres, Raschig rings, Pall rings and/or cascade rings.

* * * * *